United States Patent Office 3,472,630
Patented Oct. 14, 1969

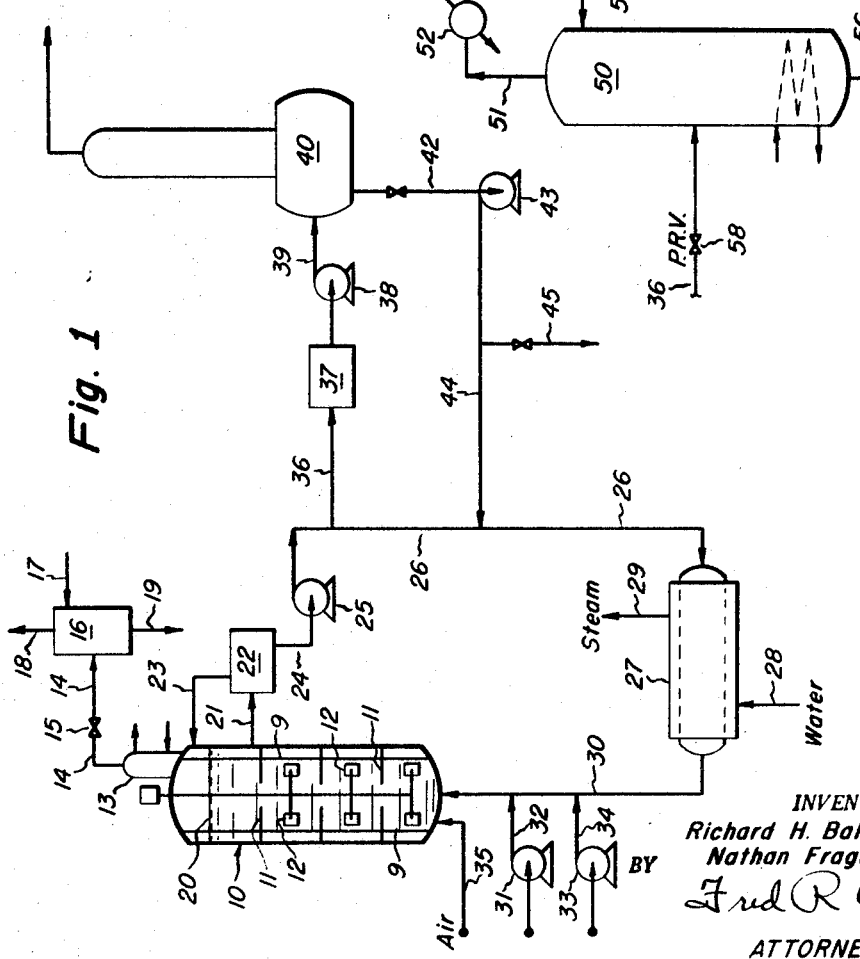

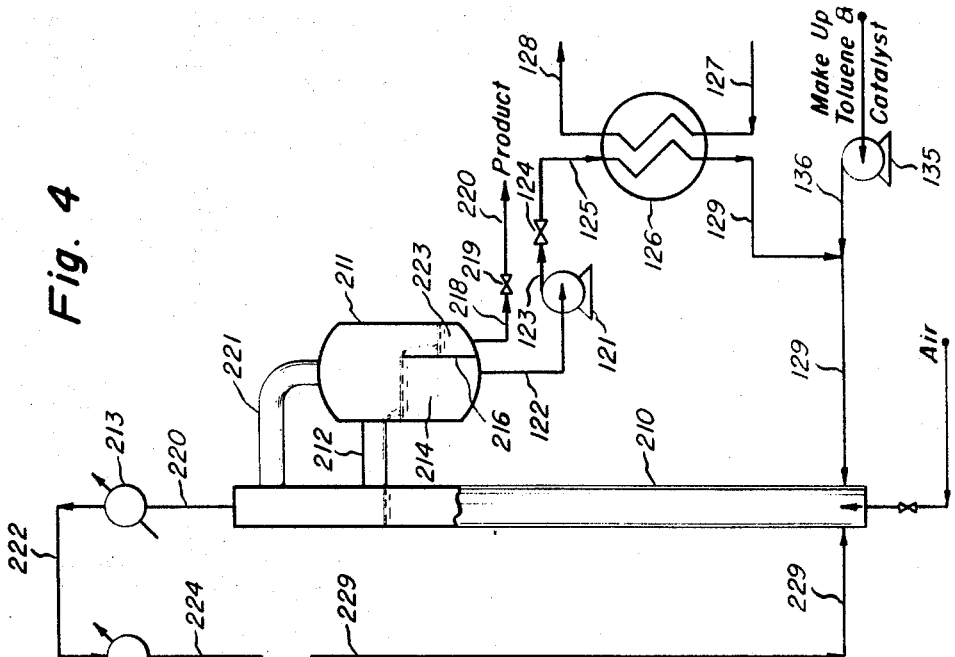
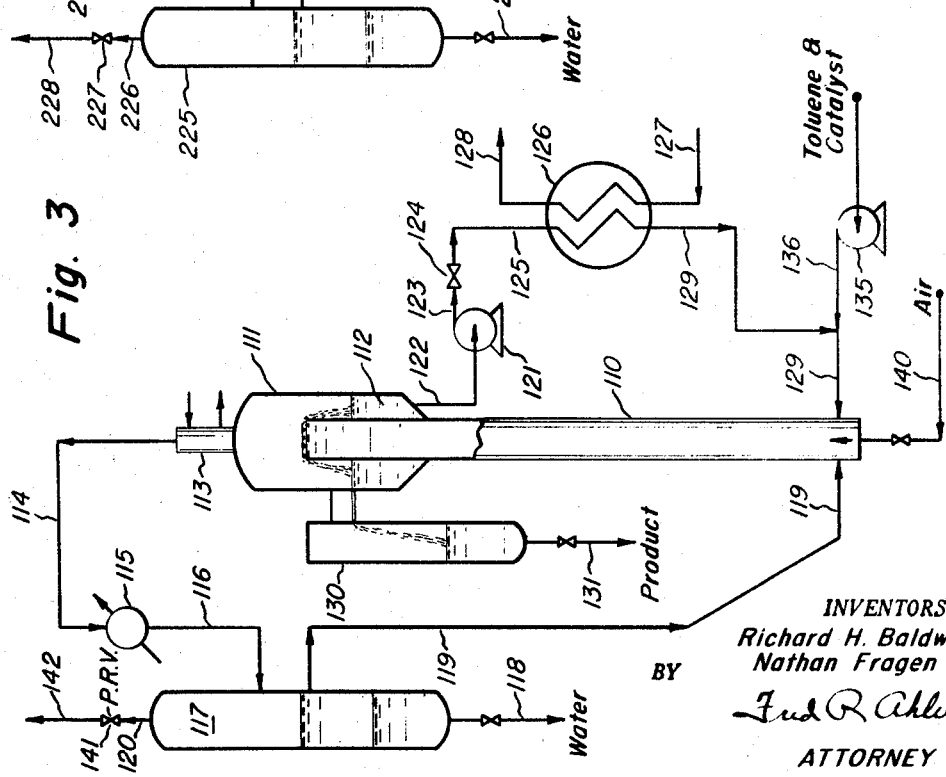

3,472,630
COMBINATION OF APPARATUS ELEMENTS FOR PRODUCTION AND RECOVERY OF DISTILLABLE AROMATIC ACID
Richard H. Baldwin, Oak Lawn, Ill., and Nathan Fragen, Hammond, Ind., assignors to Standard Oil Company, Chicago, Ill., a corporation of Indiana
Application Sept. 7, 1961, Ser. No. 155,411, which is a continuation-in-part of application Ser. No. 58,116, Sept. 23, 1960. Divided and this application Dec. 27, 1965, Ser. No. 528,673
Int. Cl. B01t 1/14
U.S. Cl. 23—285      7 Claims

ABSTRACT OF THE DISCLOSURE

A system for producing benzoic acid by liquid phase adiabatic oxidation of a monoalkylbenzene hydrocarbon, with gas-liquid disengaging means and with heat recovery and recycle of part of the oxidation product.

RELATED APPLICATIONS

This application is a divisional application of our copending application Ser. No. 155,411, filed Sept. 7, 1961, which in turn was a continuation in part of our application Ser. No. 58,116, filed Sept. 23, 1960. Both of those applications are now abandoned.

This invention relates to an improved system for the manufacture of benzoic acid wherein a monoalkylbenzene charging stock is oxidized with molecular oxygen-containing gas in the presence of liquid benzoic acid and to certain novel embodiments for removal of heat liberated by the oxidation reaction. The utilization of the system will be described and illustrated with respect to a system for preparing benzoic acid from toluene.

It is known from U.S. application Ser. No. 720,068, filed Mar. 10, 1958 (now U.S. Patent No. 2,963,509 issued Dec. 6, 1960) that monoalkylbenzene hydrocarbons can be readily oxidized with molecular oxygen-containing gas to benzoic acid by effecting the oxidation under controlled conditions in the presence of benzoic acid as the reaction medium and also in the presence of an oxidation catalyst system comprising in conjoint presence bromine and a heavy metal oxidation catalyst. Previously it was known to oxidize toluene or ethylbenzene with air in the presence of a heavy metal oxidation catalyst and a solvent such as acetic acid. The desirability of effecting such oxidations on a commercial scale, preferably in a continuous manner, has been recognized but heretofore no one has succeeded in developing a continuous process on a commercial scale. Also, until the commercial development of a process to manufacture phenol from benzoic acid and the preparation of caprolactam from benzoic acid, there has been little interest in large scale production of benzoic acid. Many of the processes for preparing benzoic acid resulted in the formation of substantial amounts of intermediate products which, although separable from benzoic acid, were not commercially attractive.

The system of this invention provides a commercially attractive process for the manufacture of benzoic acid from monoalkylbenzene hydrocarbons such as toluene, ethylbenzene, cumene, sec.-butylbenzene, etc., as charge stocks. Although it can be employed with any monoalkylbenzene hydrocarbon, toluene, ethylbenzene and cumene are the most desirable charge stocks because of availability or simplicity of preparation.

The system of this invention includes an oxidation zone wherein the oxidation of monoalkylbenzene by the oxidation reaction of the cited application can be carried out adiabatically or isothermally. In either case the heat liberated by the exothermal reaction is utilized. In the system employing an adiabatic oxidation zone, a portion of the resulting liquid reaction mixture, mainly benzoic acid, is withdrawn from the oxidation zone and passed through an external heat removal loop, preferably as the source of heat to generate steam. For example, the hot liquid reactor effluent or a heat exchange media is passed through a steam boiler in indirect heat exchange with water to produce low pressure steam, 5 to 100 p.s.i. steam. The cooled liquid reactor effluent is then returned to the oxidation zone. When benzoic acid is to be produced in a continuous manner, a slip stream of the liquid circulating in the external heat removal loop may be withdrawn, according to one embodiment of this invention, or according to other embodiments of this invention a minor portion of the same magnitude as the slip stream of the liquid reactor effluent is withdrawn separately but concurrently with the removal of the major portion of the liquid reactor effluent circulated to the external heat removal loop, and processed to recover benzoic acid product. The amount of slip stream or minor portion of the liquid reactor effluent withdrawn per unit of time will, of course, be about equal to the benzoic acid produced in the same time in the reaction zone. The makeup monoalkylbenzene is added to the cooled recycled stream. It is preferred to withdraw the slip stream from the heat removal loop prior to the generation of steam to utilize the heat in the slip stream for at least part of the recovery of benzoic acid.

Cooling of the liquid recycle reactor effluent stream to a temperature below the oxidation potential threshold temperature of the monoalkylbenzene is to be avoided. For toluene oxidized with air in the presence of corrosion metals such as chromium and/or iron this threshold temperature is about 335 to 340° F., and for toluene oxidized with commercial oxygen in the absence of such corrosion metals as when oxidized in a tantalum or titanium or glass-lined reactor the threshold temperature is 120 to 125° F. The oxidation potential threshold temperature is the minimum temperature at which the monoalkylbenzene oxidation is self-sustaining. Also to be avoided is the cooling of the liquid recycle reactor effluent below the set point of the mixture, for to cool to about the set point would result in deposits of solids in the heat removal loop and ultimately plug the transfer lines.

Benzoic acid may be recovered in many ways from the portion of liquid reactor effluent removed for processing. One suitable method is to subject the liquid slip stream to batch fractionation by first taking a fraction of materials boiling below benzoic acid and then taking a benzoic acid product fraction leaving a liquid bottoms fraction containing the heavy metal oxidation catalyst. The first fraction can be recycled to the oxidation zone. The liquid bottoms fraction is preferably recycled to the oxidation zone after fresh monoalkylbenzene charge stock is added thereto. If necessary to prevent buildup of undesired products in the system, a small purge of the recycled bottoms fraction is taken. When this is done, the catalyst in this purge is also added as makeup to the portion of the recycled bottoms. The purge, if necessary, need not exceed about 10% of the recycled bottoms.

The recovery of benzoic acid can be accomplished on a continuous basis by stripping the low boiling materials or light-ends in a first fractionator. The bottoms fraction from the first or light-ends fractionator is charged to a benzoic acid fractionator where benzoic acid product fraction is taken. The bottoms fraction from the benzoic acid fractionator is recycled to the oxidation zone, preferably after purging a minor portion, as hereinbefore described.

The system employing the isothermal oxidation zone is operated by charging to the oxidation zone molecular oxygen-containing gas and a liquid mixture containing benzoic acid, monoalkylbenzene charge stock and catalyst. The isothermal oxidation zone is in indirect heat exchange relationship with a means for heat removal, preferably for generating steam, such as for example, carrying out the reaction in a tubular coil or bundle of tubes or an elongated cylinder surrounded by a heat transfer medium, preferably water. Again the reaction mixture should not be cooled below its oxidation potential threshold temperature or near its set point temperature. The effluent from the oxidation zone is discharged to a separator to separate gases from liquids. The gases are withdrawn from the top of the separator and preferably scrubbed before venting to recover benzoic acid and intermediates. The liquid, mainly benzoic acid, is withdrawn from the separator and a major portion is recycled to the oxidation zone with makeup monoalkylbenzene and, if necessary, makeup catalyst. A minor portion of the liquid component of the oxidation zone effluent is processed to recover benzoic acid. The fractionation procedures hereinbefore described are preferred.

In either system the monoalkylbenzene charge stock can be employed in amounts of from 0.1 to 90 parts per 99.9 to 10 parts of benzoic acid by weight depending on the rate of oxidation and the residence time in the oxidation zone required to accomplish a high conversion of monoalkylbenzene. In general, a residence time of about 2 minutes to 4 hours will be suitable. When a catalyst system comprising bromine promoted heavy metal oxidation catalyst is employed, residence time of from 2 to 30 minutes will be suitable. The ratio of monoalkylbenzene to benzoic acid reaction medium is desirably 0.1 to 10, and preferably 0.1 to 5 parts per part of benzoic acid by weight.

Some of the advantages of the system of this invention are: the use of small volume reaction zones for continuous reactions; the recovery of heat of reaction, preferably as steam; large reflux condensers are not required, recovery of catalyst by recycle and the maintenance of high level catalyst in the oxidation zone to give high reaction rates; improved temperature control; less hazard, if not the elimination, of the formation of an explosive gaseous mixture since there is a high rate of oxygen utilization; and the ratio of air feed rate to hydrocarbon feed rate can be controled to give any desired oxygen level in the tail or exit gases from the reaction zone. Because of the high boiling point of benzoic acid, the system can be operated at a low pressure, atmospheric pressure, up to 400 p.s.i.g. Benzoic acid need not be recovered from solvent such as acetic acid. There is no solvent to be purified or dehydrated. Water produced by the oxidation can be readily removed by flashing from reactor effluent. Other advantages will be apparent to those skilled in the art.

The system of this invention wil be described in conjuction with the accompanying drawings wherein schematic flow drawings of the preferred system employing an adiabatic oxidation zone are illustrated.

The illustrative drawing FIGURE 1 shows a simplified schematic flow process incorporating one embodiment of this invention. The adiabatic reactor 10 contains baffles 9, compartmentation discs 11, and agitation blades 12 to provide efficient contact between the reaction mixture and the molecular oxygen-containing gas. Adiabatic reactor 10 has connected to the top thereof a hot condenser 13 for condensing benzoic acid and returning the condensate to the reaction mixtures. Uncondensed gaseous mixture containing water, oxygen, nitrogen when air is the source of molecular oxygen-containing gas, and a small amount of benzoic acid are withdrawn through vent gas conduit 14 containing a pressure regulator 15 to vent gas scrubber 16 where the gaseous mixture may be scrubbed with water charged through line 17. Scrubbed gases are withdrawn from the top of scrubber 16 through conduit 18 and the aqueous scrubber liquor is withdrawn from the bottom of scrubber 16 through conduit 19 for recovery of benzoic acid from the scrubber liquor or the uncondensed gaseous mixture can be transferred from vent gas conduit 14 to a cold condenser to condense water and toluene, the toluene-water condensate collected and the remaining gases scrubbed or preferably vented through a pressure regulator to atmospheric pressure as hereinafter described.

The top level of the liquid phase reaction mixture is shown at 20. A portion of the liquid reaction mixture is withdrawn from near the top of the liquid phase reaction mixture in adiabatic reactor 10 by conduit 21 for heat removal in the external loop. Preferably with such an oxidation reactor the withdrawn liquid is taken first into a separator such as separator 22 where vapors can be separated and returned to the top of the reactor as by conduit 23. The vapor free liquid is withdrawn from separator 22 by conduit 24 and pump 25 or by a submerged sump pump and circulated in the heat removal loop containing conduit 26 and an indirect heat exchanger or steam generating means such as boiler 27 to which feed water is charged through line 28 and from which steam is withdrawn through steam conduit 29. Cooled reactor effluent is returned to the bottom of adiabatic reactor 10 through charging conduit 30 to which are added fresh monoalkylbenzene charge stock and makeup catalyst through pump 33 and conduit 34. Air or other source of molecular oxygen-containing gas such as commercial oxygen is charged to the bottom of adiabatic reactor 10 through oxygen conduit 35.

The adiabatic reactor can also be a continuous tube or pipe reactor. In this case all charging; e.g., air, recycle benzoic acid, makeup catalyst and makeup charge stock, is done at one end and total reactor effluent is passed into a separator from which vapors are discharged from the top thereof to hot and cold condenser or hot condenser and scrubber 17 through a pressure reducer. The vapor free liquid is circulated in the heat removal loop as above described.

In the remaining portion of FIGURE 1, a portion of the liquid in conduit 26 is withdrawn through slip stream transfer line 36 to surge tank 37 and periodically charged to batch still 40 through conduit 38 and pump 39. Crude benzoic acid is fractionated in batch still 40, removing water, an overhead fraction containing benzaldehyde and/or benzyl alcohol which can be combined with the still bottoms in conduit 44, an overhead benzoic acid product fraction and a fluid bottoms fraction containing benzoic acid and catalyst which is recycled to adiabatic reactor 10 through valved bottoms conduit 42, pump 43 and conduit 44 as shown. A purge stream can be taken, if necessary, from recycle bottoms in conduit 44 through valved conduit 45.

To produce 5370 pounds per hour of benzoic acid in the above system from 4100 pounds per hour of fresh toluene charge stock, the mixture flowing into adiabatic reactor 10 through charge conduit 30 is at 340° F. This mixture contains on an hourly basis:

4100 pounds toluene,
294,163 pounds benzoic acid,
1183 pounds benzaldehyde
6560 pounds water and
100 pounds tetrabromoethane and heavy metal catalyst originally charged as:
120 pounds manganese acetate tetrahydrate
60 pounds cobaltous acetate tetrahydrate.

Air is charged to adiabatic reactor 10 at the rate of 344 pound moles per hour. The pressure in adiabatic reactor 10 is maintained at 300 to 400 p.s.i.g. Condenser 13 is operated at slightly above 252° F. The gaseous mixture withdrawn through line 14 contains, in addition to a small amount of oxygen (about 2% by volume) and the nitrogen from the air, 20 pounds benzoic acid and 671 pounds water per hour.

From adiabatic reactor 10 there is withdrawn through conduit 21 to separator 22, thence through conduit 24 by pump 25 to conduit 26, 307,703 pounds per hour reactor effluent at 400° F. A slip stream of 5969 pounds per hour is taken through conduit 36 containing 5810 pounds benzoic acid, 23 pounds benzaldehyde and about 6 pounds of heavy metal catalyst. The remainder of the liquid effluent at 400° F. is charged to steam boiler 27 to remove 9.3 mm. B.t.u./hr. as 75 p.s.i.g. steam and is thereby cooled to 345° F. To this cooled stream is added 4100 pounds toluene per hour, the benzaldehyde fraction of 226 pounds containing 23 pounds benzaldehyde and 203 pounds benzoic acid from the batch benzoic acid still, and the still bottom containing 180 pounds benzoic acid and the heavy metal (cobalt and manganese) catalyst. A purge stream containing 50 pounds benzoic acid and about 20% of the catalyst in the slip stream is taken to prevent build up of colored impurities. The heavy metal catalyst makeup equal to that lost in the purge stream and makeup tetrabromoethane are added to the recycled still bottoms before combining with the stream from the heat removal loop.

The distilled benzoic acid product produced at an average rate of 5370 pounds per hour is obtained in a 99+% purity.

In place of the batch benzoic acid still 40 and the associated surge tank 37 and pump 38 and conduit 39, there can be employed two fractionation columns for continuous recovery of benzoic acid product. The slip stream from transfer conduit 36 is fed to a light-ends fractionator where water is stripped off and an overhead benzaldehyde fraction is taken from an upper portion of the light-ends fractionator. Crude benzoic acid is pumped from the bottom of the light-ends fractionator to a benzoic acid fractionator where benzoic acid is taken as an overhead fraction and the bottom from this second fractionator are recycled as hereinbefore described. Such a combination of fractionators is operated at reduced pressure to minimize thermal decomposition and to permit the use of lower temperature heating media. The light-ends fractionator can be operated at 450° F. and 300 mm. Hg at the bottom and 365° F. and 200 mm. Hg at the top. The benzoic acid fractionator can be operated at 300 mm. Hg and 400° F. at the bottom and 375° F. and 125 mm. Hg at the top. The overhead fractions from each of these fractionators can be conveniently taken with reflux splitters.

Another system within this invention employs an isothermal reactor in indirect heat exchange relationship with a means for generating steam. For example, such a reactor can be a continuous tube in a steam generating drum to which water is added and steam withdrawn to maintain a reaction temperature in the reactor tube of from 360 to 400° F. The recycle benzoic acid and catalyst, fresh toluene and air, are charged to one end and the total reactor effluent, vapors and liquid are withdrawn from the opposite end of the reactor tube. The reactor effluent is charged to a separator from which water vapor, oxygen and nitrogen are vented through a pressure regulator. The separated liquid is withdrawn from the bottom of the separator, and a portion containing an amount of benzoic acid chemically equivalent to the toluene charged is withdrawn as a slip stream for benzoic acid product recovery as before. The remainder of the reactor tube liquid effluent is recycled to the charge end of the reactor tube.

The recycle ratio of benzoic acid to monoalkylbenzene charge stock can be varied over a rather wide range from 40 to 1000, desirably 50 to 100 and preferably 60 to 80 parts benzoic acid for each part of monoalkylbenzene hydrocarbon charge stock by weight. The high ratios of benzoic acid to hydrocarbon charge stock, such as 100 to 1000 parts of benzoic acid per part of charge stock, can be employed where heat of reaction is removed by the formation of low pressure steam directly or indirectly or even removed by air cooling when only a heavy metal oxidation catalyst without a bromine promoter therefor is employed, in which case a reaction residence time of 10 to 30 times as long is required than when bromine promoted heavy metal oxidation catalyst is employed. The preferred recycle ratio of benzoic acid to monoalkyl-benzene charge stock is employed with the preferred bromine promoted heavy metal oxidation catalyst system for such a catalyst will provide a higher rate of reaction and substantially complete conversion of the aromatic charge stock to mainly benzoic acid (95% and above) at lower residence times.

Another embodiment of this invention for recovery of benzoic acid product comprises charging the reactor effluent from a batch process or a slip stream from a continuous oxidation process as herein described to a stripping column where 85 to 95% of the benzoic acid together with toluene, benzaldehyde and, if present, water in the mixture charged is removed as an overhead product, and the remaining 5 to 15% of the benzoic acid mixture charged to the stripping column is withdrawn as bottoms and recycled to the oxidation system. These bottoms contain the heavy metal oxidation catalyst and, when used, most of the bromine portion of the catalyst. The overhead aromatic materials removed in the stripping column are fed to a fractionating column where a fraction containing benzaldehyde (B.P. 179° C.), benzyl alcohol (B.P. 204.7° C.) and a small amount of benzoic acid, about 2 to 5% of the benzoic acid charged to this fractionating column, are taken as an overhead fraction or forecut fraction and recycled to the oxidation process and any remaining bromine or bromine-containing compounds are also removed with this over head fraction. The benzoic acid (B.P. 249° C.) product can be taken as a bottom fraction. Both of these distillates can be carried out at reduced pressure, subatmospheric pressure, or atmospheric pressure or at superatmospheric pressure.

Although the foregoing recovery of benzoic acid is applicable to reactor effluents containing low concentrations of benzoic acid in monoalkylbenzene, as low as 1.0%, this recovery process would involve distilling a large quantity of monoalkylbenzene twice for effluents containing up to about equal parts by weight of benzoic acid and monoalkylbenzene. Hence, the use of this recovery process is preferably employed when the benzoic acid concentration in the effluent product stream is greater than 50% by weight. This embodiment can be described by the following specific application thereof in connection with FIGURE 2, which replaces the distillation system of FIGURE 1.

From the oxidation of toluene with air at 430° F. and 400 p.s.i.g. in the presence of benzoic acid and in the presence of a catalyst containing manganese and cobalt (charged as their acetate tetrahydrates) and tetrabromoethane as the form of bromide, there is taken from conduit 26 through slip stream transfer line 36 a mixture containing benzoic acid, toluene, benzaldehyde and the catalyst. The ratio of benzoic acid to toluene is 70 to 30 parts by weight, respectively. The slip stream at 430° F. and 400 p.s.i.g. is charged through pressure reducer 58 to stripping column 50 operating at a top pressure of 200 mm. Hg absolute and 365° F. having vapor transfer line 51, condenser 52, condensate receiver 53, transfer line 55 and reflux transfer line 54 to remove 90% of the benzoic acid and all of the toluene and benzaldehyde (benzyl alcohol, if present). The bottom from the stripping column are taken by conduit 56 and pump 57 and pressurized to 400 p.s.i.g. before charging to conduit 44 for recycle to the oxidation zone with externally circulating reactor effluent from which the slip stream was taken. Fresh makeup toluene is added to the bottoms.

The stream of benzoic acid containing toluene and benzaldehyde with bromine in a concentration of 5 to 50 p.p.m. based on the benzoic acid is charged through conduit 55 to fractionator 60 operating at 200 mm. Hg absolute at the top and 300 mm. Hg at the bottom with a top temperature of 325° F. and a bottom temperature of 425° F. An overhead fraction containing all of the toluene and benzaldehyde (benzyl alcohol, if present) and 5% of the benzoic acid charged to the fractionator is taken through vapor line 61 to condenser 62. The condensate is collected in receiver 63, taken through conduit 64 by pump 65 and pressurized to 400 p.s.i.g. before combining with the recycle streams in conduit 44. Molten benzoic acid product, 85 to 86 percent of that charged from transfer line 36 to stripping column 50, is taken from fractionator 60 as bottoms therefrom through conduit 66 and pump 67 discharging into transfer line 68 which can feed a drum flaker, a briquetter or a hydrogenation process for the preparation of cyclohexane carboxylic acid.

FIGURE 1 illustrates the present invention by way of one embodiment of an adiabatic oxidation zone from which the liquid reactor effluent withdrawn therefrom is passed through an external heat removal loop. Another embodiment of the use of an adiabatic oxidation zone is illustrated in FIGURE 3 and still another is illustrated in FIGURE 4. In each of the systems of FIGURE 3 and FIGURE 4 there is also employed withdrawal of liquid reactor effluent to an external heat exchange loop. The production of benzoic acid from toluene in these adiabatic oxidation zones is conducted as hereinafter described with reference to each drawing.

In FIGURE 3, a schematic illustration of the apparatus employed, the oxidation is conducted, for example at 300 p.s.i.g., in adiabatic reactor 110 shown as a vertical tubular vessel closed at the bottom and extending into an enlarged cross-section reactor-separator 111. Liquids and gases in adiabatic reactor 110 at about 410° F. flow out of the top thereof into reactor-separator 111 wherein gases and vapors are disengaged. Liquids, mainly benzoic acid and toluene, are collected in sump 112 and the mixture of gases and vapors, gasiform mixture, leaves the top of reactor-separator 111 and pass through a hot condenser such as knock-back or reflux condenser 113 operated at a temperature to condense benzoic acid vapors and return liquid benzoic acid condensate to reactor-separator 111. The gasiform mixture is conducted from the hot condenser by transfer line 114 through cooler 115 and conduit 116 to a separator 117. Cooler 115 is operated at a temperature at which water and toluene can be condensed at 300 p.s.i.g. A water layer is withdrawn from the bottom of separator 117 through valved conduit 118. Toluene at 300 p.s.i.g. flows from separator 117 through overflow conduit 119 to the bottom of adiabatic reactor 110. Uncondensed gases are withdrawn from separator 117 through gas transfer line 120, a pressure reducer such as pressure reducing valve 141 to vent line 142.

Liquid reactor effluent in sump 112 is withdrawn from the bottom thereof by pump 121 through conduit 122 and discharged through conduit 123, flow controller such as throttle valve 124 to transfer line 125 then to indirect heat exchanger 126 through which flows a heat exchange medium entering by conduit 127 and leaving by conduit 128. The cooled portion of the liquid reactor effluent leaves indirect heat exchanger 126 by conduit 129 and flows into the bottom of adiabatic reactor 110. The rate of withdrawal of liquid reaction mixture from sump 112 is controlled to permit overflow of reactor effluent to side arm product receiver 130 open to reactor-separator 111 at a rate to provide the benzoic acid in the reactor effluent necessary for recovery of the amount of purified benzoic acid desired. Side armproduct receiver 130 is closed, except as to the arm open to sump 112 of reactor-separator 111 so that side arm product receiver is at the same pressure as reactor-separator 111. Liquid reactor effluent at 410° F. and 300 p.s.i.g. containing benzoic acid and toluene with some benzaldehyde is withdrawn from the bottom of side arm product receiver 130 through valved conduit 131 and sent to a recovery system such as the distillation systems hereinbefore described, preferably that of FIGURE 2, where the minor portion of liquid reactor effluent enters conduit 36, is flashed through pressure reducer 58 to stripping column 50 and further processed as hereinbefore described.

Fresh toluene in an amount equivalent to that withdrawn by valved conduit 131, equal to the toluene oxidized, together with an amount of catalyst equal to that removed with liquid reaction effluent by valved conduit 131, are charged to conduit 129 by pump 135 and feed makeup conduit 136 from a source not shown. Air is charged to the bottom of adiabatic reactor 110 by air charge line 140 from a source (not shown) of compressed air at about 300–310 p.s.i.g. This provides an upward lift and mixing in adiabatic reactor 110 as well as supplying molecular oxygen for the oxidation of toluene.

In FIGURE 4 the oxidation of toluene to benzoic acid is also conducted at 300 p.s.i.g. in adiabatic reactor 210 to which is attached closed reactor-separator 211 by suitable liquid reactor effluent overflow conduit such as arm 212 and gasiform transfer arm 221 as shown. Adiabatic reactor 210, shown as a vertical tubular vessel, is operated with reactor level to provide overflow of reactor effluent into side arm connected reactor-separator 211 which contains recycle sump 214 and drawoff sump 223 provided by baffle 216 in the bottom zone of reactor-separator 211. The gasiform mixture disengaged at 300 p.s.i.g. and about 410° F. both in the top of adiabatic reactor 210 and in reactor-separator 211 flow through transfer line 220 to a hot condenser such as condenser 213 which will permit return of benzoic acid condensate to adiabatic reactor 210. Materials not condensed in the hot condenser are conducted by transfer line 222 to cooler 215 operated to condense water and toluene which flow with cooled gases to separator 225 through conduit 224. The gases are withdrawn from the top of separator 225 through conduit 226 and pressure reducer 227 discharging into vent 228. The toluene layer in separator 225 flows into overflow conduit 229 to the bottom of adiabatic reactor 210. The water layer in separator 225 is withdrawn through valved conduit 230.

Air under pressure, 300 to 310 p.s.i.g., is charged into the bottom of adiabatic reactor 210 providing the aforesaid lifting and mixing as well as oxygen for the oxidation reaction.

The two sump zones in side arm connected reactor-separator 211, together with baffle 216, permit accumulation of liquid reactor effluent (410° F. and 300 p.s.i.g.) for withdrawal to the heat removal loop and for withdrawal of the minor portion of liquid reactor effluent for recovery of benzoic acid product. The use of the external heat exchange loop with elements numbered as in FIGURE 3 are employed and function as described in connection with that figure. The amount of flow over baffle 216 can be controlled by the height thereof, by the rate of withdrawal by pump 121 and by throttle valve 124 or a combination of all of these means to provide the minor portion of liquid reactor effluent required by the benzoic acid recovery system fed by withdrawing liquid reaction medium from sump 223 through conduit 218, flow control valve 219 discharging into conduit 220 which can be connected to conduit 36 to feed either surge tank 37 in FIGURE 1 or stripping column 50 in FIGURE 2.

The oxidation of toluene to benzoic acid as hereinbefore described in detail can be conducted in either adiabatic reaction vessel of FIGURES 3 or 4 where the reaction pressure is 300 p.s.i.g. and the air flow is 1.40 pound mole per 22 pounds benzoic acid produced per hour. This will provide liquid and gasiform reactor effluents at about 410° (about 240° C.) containing about 90% up to 98% benzoic acid when the recycle reactor effluent in conduit 129 is about 340° F. For heat exchange in indirect heat exchanger 126, water under pressure (inlet 260° F. and outlet at 280° F.), or liquid hydrocarbons thermally stable at temperatures up to 600° F., chlorinated polyphenyls such as the chlorinated biphenyls and terphenyls, or eutectic mixtures of diphenyl and biphenyl oxide such as "Dowtherm" heat transfer medium of Dow Chemical Company can be used. When such heat transfer media are employed, the heat removed from the liquid reaction mixture can be utilized for example by using the hot heat transfer medium as a source of at least a portion of the heat for stripping column 50 or fractionator 60 or to heat water to generate steam. When water under pressure is employed as heat transfer medium, it can be flashed to reduce pressure to generate steam. Also indirect heat exchanger 126 can be operated to generate steam as hereinbefore described. The liquid reaction mixture should not be cooled below the temperatures hereinbefore set forth. With liquid reaction product being produced at about 410° F. (about 240° C.) the liquid reaction mixture flowing in the external heat exchange loop need not be cooled below 340° F. to provide suitable control of the oxidation reaction. The heat to be removed by indirect heat exchanger 126 when cooling from 410° F. to 340° F. on an hourly basis is about 500 B.t.u. per pound (about 250K per kg) of benzoic acid produced.

In both of the systems of FIGURES 3 and 4, the reactor-separator side arm receiver, separators 117 and 225 the hot and cold condensers are under the same pressure that the reaction is conducted, in the above case, which in the above specific cases described is 300 p.s.i.g. The uncondensed gases are usually vented to atmospheric pressure unscrubbed or scrubbed as hereinbefore described. Water is withdrawn periodically to prevent return to the adiabatic reactor.

The adiabatic reactors, external heat exchange loop and means for obtaining liquid reactor effluent for recovery of benzoic acid as illustrated and described in connection with FIGURES 3 and 4 are especially advantageous to employ for continuous operation in combination with the recovery system illustrated and described in connection with FIGURE 2. Thus with substantially the same feed rate, air flow and liquid reaction mixture recycle rate hereinbefore employed there is obtainable from the oxidation system of FIGURES 3 and 4 in combination with the recovery system of FIGURE 2 a molten benzoic acid product of high purity in an amount of 85 to 86 percent of the 5810 pounds benzoic acid in the 5969 pounds per hour of liquid reaction mixture removed from the adiabatic reactor.

Although the use of manganese and/or cobalt compounds is preferred as the heavy metal oxidation catalyst, such other heavy metal oxidation catalysts, those having an atomic number of from 23 to 84, desirably 23 to 28 inclusive, and more particularly nickel, chromium, vanadium, molybdenum, tungsten, tin and cerium can be used. As illustrated, combinations of metals can be employed. The heavy metals may be employed in a form soluble in the monoalkylbenzene charge stock but preferably soluble in the benzoic acid at least to provide from 3 to 10% based on the aromatic hydrocarbon charge stock. As sources of bromine there can be added ionic bromine, elemental bromine or covalent combined bromine. Suitable forms of bromine include elemental bromine, ammonium bromide, potassium bromate, tetrabromoethane (as illustrated) and benzyl bromide. Bromides of the heavy metals soluble in the reaction mixture (which can contain water as illustrated) can be employed. For example, manganese and cobaltous bromides, bromides of chromium, iron, gadolinium, lead and nickel (trihydrate) are sufficiently water soluble to be employed to provide the preferred oxidation catalyst.

What is claimed is:

1. An apparatus system for producing benzoic acid product by continuous liquid phase oxidation of monoalkylbenzene hydrocarbon charging stock in the presence of benzoic acid, which system comprises a vertical tubular oxidation reactor having and oxidation zone therein, a charging conduit for introducing through the bottom of the reactor and into the oxidation zone a liquid mixture containing benzoic acid and the monoalkylbenzene charging stock, a separate conduit for introducing molecular oxygen-containing gas through the reactor bottom and into the oxidation zone, means for disengaging gaseous mixture and liquid and for collecting a portion of liquid reaction mixture from the upper portion of said oxidation zone, means in indirect heat exchange relationship for removing heat of reaction from the reaction mixture outside said reaction zone, a transfer conduit and pump for withdrawing at least a major portion of liquid reaction mixture from said means for collecting the disengaged liquid reaction mixture, down stream of said pump a transfer means for splitting liquid stream into a minor stream and a major stream for circulating the major stream portion of liquid reaction mixture through said means for indirect heat exchange back to the oxidation zone charging conduit, a fractionator means connected to receive said minor stream for separation of benzoic acid product from the minor stream of liquid reaction mixture, and a pump and conduit for recycling bottoms from said fractionator means to the oxidation zone charging conduit.

2. The apparatus system of claim 1 which includes a first cooler attached to the top of said oxidation reactor to receive disengaged gaseous mixture and to return benzoic acid condensate to said oxidation zone and discharge uncondensed vapors, a second cooler, a separator, conduit for transfer of discharged uncondensed vapors from said first cooler through said second cooler to said separator and a pressure reducer gas vent attached to said separator.

3. The apparatus system of claim 1 wherein the fractionator means for benzoic acid product recovery comprises series connected stripping column and a fractionating column each having an overhead fraction discharge at the top and a bottoms fraction discharge at the bottom, a conduit and pressure reducer connected to receive said minor stream and discharge it as feed into said stripping column, conduit for transfer to overhead fraction from said stripping column as feed to the fractionating column, conduit to receive bottoms discharge from the stripping column and transfer said bottoms to said conduit and pump for recycle of said bottoms to the oxidation zone charging conduit, a cooler and condensate receiver connected to the overhead fraction discharge of said fractionating column, conduit and pump for transfer of condensate from said receiver to the oxidation zone charging conduit, and conduit and pump to withdraw benzoic acid product from said fractionator column bottoms fraction discharge.

4. The apparatus system of claim 1 wherein a knockback hot condenser is attached to the top of said reactor to receive therefrom disengaged gaseous mixture and to return benzoic acid condensate to said oxidation zone and said hot condenser having an uncondensed gas discharge and a vent gas scrubber having an inlet for introducing water, an aqueous scrubber liquor discharge and a discharge vent to release scrubber gas and conduit with a pressure reducer to receive uncondensed gas from said hot condenser discharge for transfer to said scrubber.

5. The apparatus system of claim 1 wherein said indirect heat exchange means comprises means for generating steam by indirect heat exchange between water and said major stream circulating back to the oxidation zone charging conduit.

6. An apparatus system for producing benzoic acid product by oxidizing toluene with air in the presence of liquid benzoic acid, which system comprises a vertical tubular oxidation zone closed at the bottom and open at the top thereof, separator of greater cross-section than said tubular reaction zone, said separator having an upper condensing zone and enclosing the upper portion of said tubular reaction zone to form a closed system there-with and receive liquid reaction mixture overflow therefrom, a charging conduit for introducing a liquid mixture containing benzoic acid and toluene into the bottom of said oxidation zone, a separate conduit for introducing air into the bottom of said oxidation zone, a side arm receiver attached to said separator to receive a minor portion of liquid reaction mixture therein, a cooler, a toluene-water collector, conduit for transfer of vapors from said separator condensing zone through said cooler to said collector, conduit for passing gases from the top of said collector through a pressure reducer, a heat exchanger outside said oxidation zone, and conduit and pump for circulating a major portion of said liquid reaction mixture from said separator through said heat exchanger to said charging conduit.

7. An apparatus system for producing benzoic acid product by liquid phase oxidation of toluene with air in the presence of liquid benzoic acid, which system comprises a tubular oxidizer closed at the top and bottom thereof and having a lower oxidation zone an upper vapor space, a receiver separated into two parts by a weir to divide liquid flowing into said receiver into major and minor portions; conduit to transfer total liquid reaction mixture overflow from said oxidation zone to said receiver, conduit connecting said receiver with said upper vapor space charging conduit for introducing a liquid mixture containing benzoic acid and toluene into the bottom of said oxidation zone, a separate conduit for introducing air into the bottom of said oxidation zone, and a vapor discharge at the top of the oxidizer; a reflux condenser; a cooler; a toluene-water condensate collector having a pressure reducing gas vent; conduit to transfer vapors discharged from the top of said oxidizer through the reflux condenser to said cooler and then to said condensate collector, conduit for withdrawing said minor portion of liquid from said collector through a pressure reducer for benzoic acid recovery in a means for conducting fractionation; a heat exchanger outside said oxidation zone, and conduit and pump for withdrawing from said receiver said major portion of liquid overflow and circulating it through said heat exchanger to said charging conduit.

References Cited

UNITED STATES PATENTS

| | | | |
|---|---|---|---|
| 2,134,571 | 10/1938 | Norlock | 23—285 |
| 2,712,550 | 7/1955 | Cheney et al. | 260—524 |
| 2,720,447 | 10/1965 | Jones et al. | 23—288 X |
| 2,788,367 | 4/1957 | Bills et al. | 260—524 |
| 2,871,108 | 1/1959 | Knapp | 23—288 |
| 2,963,509 | 12/1960 | Barker et al. | 260—524 |
| 2,964,559 | 12/1960 | Burney et al. | 260—524 |
| 3,053,643 | 9/1962 | Osborne | 23—288 |
| 3,281,214 | 10/1966 | Stein | 23—285 |

JOSEPH SCOVRONEK, Primary Examiner

U.S. Cl. X.R.

23—263, 288; 260—524